(12) United States Patent
Hiramatsu

(10) Patent No.: US 6,195,402 B1
(45) Date of Patent: Feb. 27, 2001

(54) PATTERN MATCHING APPARATUS

(75) Inventor: Katsuhiko Hiramatsu, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/932,534

(22) Filed: Sep. 17, 1997

(30) Foreign Application Priority Data

Sep. 25, 1996 (JP) .................................................. 8-272905

(51) Int. Cl.⁷ ...................................................... H04L 7/00
(52) U.S. Cl. ............................................. 375/368; 375/343
(58) Field of Search ........................ 364/728.03, 728.02, 364/728.06, 728.07; 371/5.1, 5.2, 5.3, 5.4, 21.1, 21.2, 21.3; 375/342, 343, 365, 366, 368; 382/209

(56) References Cited

U.S. PATENT DOCUMENTS 4,903,225 * 2/1990 Brost ................................ 364/728.03
5,710,775 * 1/1998 Nakayasu .............................. 371/5.1
5,748,688 * 5/1998 Kim et al. ............................. 375/368

FOREIGN PATENT DOCUMENTS 4-291848  10/1992  (JP) .
7-99487   4/1995   (JP) .

* cited by examiner

Primary Examiner—Stephen Chin
Assistant Examiner—Chieh M. Fan
(74) Attorney, Agent, or Firm—Venable; Robert J. Frank; Allen Wood

(57) ABSTRACT

In a multi-value modulation system such as M bits/1 symbol, a pattern matching apparatus is arranged by a coincident bit number detecting circuit for detecting a coincident bit number between a reception symbol and the known pattern owned by a receiver within 1 symbol; a delay circuit for delaying a detection result; and an adder. Then, a coincident bit number between the received 1 symbol (M bits) and 1 symbol (M bits) of the known pattern is detected. This detected bit number is added to each other, so that when a length of a UW pattern is N bits, the total number of adders can be reduced to N/M.

15 Claims, 9 Drawing Sheets

```
            aiaq
         00  01  11  10
      00 10  01  00  01
xixq  01 01  10  01  00
      11 00  01  10  01
      10 01  00  01  10
```

```
           aiaq
          | 00  11
       ---+--------
       00 | 10  00
xixq   01 | 01  01
       11 | 00  10
       10 | 01  01
```

FIG.9
PRIOR ART
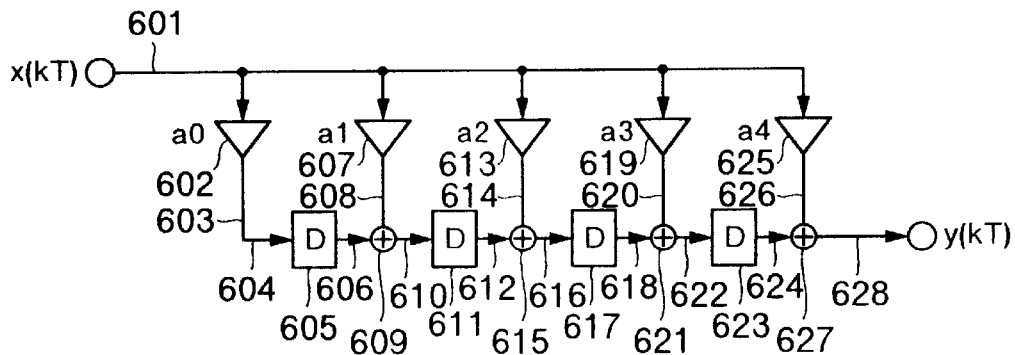
FIG.10
PRIOR ART
| UW PATTERN | MESSAGE |
FIG.11
| INPUT | OUTPUT |
|---|---|
| $x(0T)$ | $y(0T)=a4*x(0T)$ |
| $x(1T)$ | $y(1T)=a4*x(1T)+a3*x(0T)$ |
| $x(2T)$ | $y(2T)=a4*x(2T)+a3*x(1T)+a2*x(0T)$ |
| $x(3T)$ | $y(3T)=a4*x(3T)+a3*x(2T)+a2*x(1T)+a1*x(0T)$ |
| $x(4T)$ | $y(4T)=a4*x(4T)+a3*x(3T)+a2*x(2T)+a1*x(1T)+a0*x(0T)$ |
| $x(5T)$ | $y(5T)=a4*x(5T)+a3*x(4T)+a2*x(3T)+a1*x(2T)+a0*x(1T)$ |
| $x(6T)$ | $y(6T)=a4*x(6T)+a3*x(5T)+a2*x(4T)+a1*x(3T)+a0*x(2T)$ |
| ⋮ | ⋮ |
| $x(kT)$ | $y(kT)=a4*x(kT)+a3*x((k-1)T)+a2*x((k-2)T)+a1*x((k-3)T)+a0*x((k-4)T)$ |

PATTERN MATCHING APPARATUS

BACKGROUND OF THE INVENTION

The present invention generally relates a pattern matching apparatus of a communication apparatus with employment of a multi-value modulation method. More specifically, the present invention is directed to such a pattern matching apparatus that even when a length of a pattern is extended, a total number of adders as well as a total number of D-FFs (D type flip-flops) are not increased.

Referring now to drawings, the conventional pattern matching apparatus will be described. FIG. 9 is a schematic block diagram for representing an arrangement of one conventional pattern matching apparatus. FIG. 10 illustrates a frame format used to explain operation of the conventional pattern matching apparatus depicted in FIG. 9.

As represented in FIG. 10, in the conventional pattern matching apparatus, the known symbol pattern (normally, called as a "synchronization word" or a "unique word", and will be referred to as a "UW pattern (unique word pattern) hereinafter)" is detected from the received signal, and this known symbol pattern is utilized as follows:

To synchronize a frame/slot,

To detect a head symbol of the reception signal,

To judge reliability of the received signal etc.

Next, operations of the conventional pattern matching apparatus shown in FIG. 9 will now be explained with reference to FIG. 11. In FIG. 11, symbol x(kT) indicates the received signal.

At a Time Instant 0T

An input signal x(0T) is multiplied by coefficients a0, a1, a2, a3, and a4. Since an initial value of D-FF 623 is equal to 0, an output y(0T) is given by y(0T)=a4*x(0T). At this time, since the quantity of input data is not equal to that of the patterns, no UW pattern detection decision is carried out.

At a Time Instant 1T

Since an initial value of a D-FF located at one preceding stage is equal to 0, the multiplication results between the input signal x(0T) and the coefficients a0, a1, a2, a3, and a4 are stored into the D-FF respectively. Another input signal x(1T) is multiplied by the coefficients a0, a1, a2, a3, and a4. Since the value of the D-FF 623 is equal to a3*x(0T), an output y(1T) is given by y(1T)=a3*x(0T)+a4*x(1T). At this time, since the quantity of the input data is not equal to that of the patterns, no UW pattern detection decision is carried out.

At a Time Instant 2T

The result of the (multiplication result) between an input signal x(1T) and the coefficient a0 is stored into a D-FF 605. An result of the (addition result) obtained by adding the 1-T preceding value of the DD-FF 605 to the multiplication result between the input signal x(1T) and the coefficient a1 is stored into a D-FF 611. Another addition result obtained by adding the 1-T preceding value of the D-FF 611 to the multiplication result between the input signal x(1T) and the coefficient a2 is stored into a D-FF 617. Another addition result obtained by adding the 1-T preceding value of the D-FF 617 to the multiplication result between the input signal x(1T) and the coefficient a3 is stored into a D-FF 623. Another input signal x(2T) is multiplied by the coefficients a0, a1, a2, a3, and a4. Since the value of the D-FF 623 is equal to:

$$a2*x(0T)+a3*x(1T),$$

an output y(2T) is given by:

$$y(2T)=a2*x(0T)+a3*x(1T)+a4*x(2T).$$

At this time, since the quantity of the input data is not equal to that of the patterns, no UW pattern detection decision is carried out.

At a Time Instant 3T

The multiplication result between the input signal x(2T) and the coefficient a0 is stored into the D-FF 605. An addition result obtained by adding the 1-T preceding value of the D-FF 605 to the multiplication result between the input signal x(2T) and the coefficient a1 is stored into the D-FF 611. Another addition result obtained by adding the 1-T preceding value of the D-FF 611 to the multiplication result between the input signal x(2T) and the coefficient a2 is stored into the D-FF 617. Another addition result obtained by adding the 1-T preceding value of the D-FF 617 to the multiplication result between the input signal x(2T) and the coefficient a3 is stored into the D-FF 623. Another input signal x(3T) is multiplied by the coefficients a0, a1, a2, a3, and a4. Since the value of the D-FF 623 is equal to:

$$a1*x(0T)+a2*x(1T)+a3*x(2T),$$

an output y(3T) is given by:

$$y(3T)=a1*x(0T)+a2*x(1T)+a3*x(2T)+a4*x(3T).$$

At this time, since the quantity of the input data is not equal to that of the patterns, no UW pattern detection decision is carried out.

At a Time Instant 4T

The multiplication result between an input signal x(3T) and the coefficient a0 is stored into the D-FF 605. An addition result obtained by adding the 1-T preceding value of the D-FF 605 to the multiplication result between the input signal x(3T) and the coefficient a1 is stored into the D-FF 611. Another addition result obtained by adding the 1-T preceding value of the D-FF 611 to the multiplication result between the input signal x(3T) and the coefficient a2 is stored into the D-FF 617. Another addition result obtained by adding the 1-T preceding value of the D-FF 617 to the multiplication result between the input signal x(3T) and the coefficient a3 is stored into the D-FF 623. Another input signal x(4T) is multiplied by the coefficients a0, a1, a2, a3, and a4. Since the value of the D-FF 623 is equal to:

$$a0*x(0T)+a1*x(1T)+a2*x(2T)+a3*x(3T),$$

and output y(4T) is given by:

$$y(4T)=a0\times x(0T)+a1\times x(1T)+a2\times x(2T)\times(2T)+a3*x(3T)+a4*x(4T).$$

At this time, since the quantity of the input data is equal to that of the pattern, the UW pattern detection decision is commenced.

The UW pattern may be detected/judged by repeatedly performing the above-explained calculation process based upon a value y(kT) by comparing this value y(kT) with the threshold value. This value y(kT) is calculated by the following formula (1):

$$y(kT)=a0*x((k-4)T)+a1*x((k-3)T)+a2*x((k-2)T)+a3*x((k-1)T)+a4*x(kT) \qquad (1)$$

It should be noted that when the input signal x(kT) corresponds to digital data after the decoding operation, as represented in FIG. 12, the detection/judgement of the UW pattern may be realized not by way of the multiplications by the coefficients a0, a1, a2, a3, and a4, buy by way of an exclusive OR gating operation.

SUMMARY OF THE INVENTION

As previously described, since the conventional pattern matching apparatus is arranged by the multipliers, the adders, and the D-FFs, when the length of the pattern increases, the total number of these adders and the bit number of the adder increases. This causes the circuit scale to increase. Also, in such a multi-value modulation system where a plurality of bits is represented by 1 symbol, the total number of the adders is increased. This increase is shown in FIG. 13. That is, FIG. 13 exemplifies a 2-value modulation system where 2 bits are represented by 1 symbol.

The present invention solves the above-described problems, and therefore, has an object to provide a pattern matching apparatus capable of reducing the total number of adders and D-FFs even when a length of a pattern increases.

A pattern matching apparatus of the present invention is realized by utilizing the feature of the multi-value modulation system such as M bits/1 symbol. That is, a coincident bit number between the received 1 symbol (M bits) and 1 symbol (M bits) of the known pattern is detected, and this detected bit number is added to each other, so that when a length of a UW pattern is N bits, the total number of adders can be reduced to N/M.

A pattern matching apparatus is described comprising: in the case of a multi-value modulation system where a plurality of bits is represented by 1 symbol is employed in a receiver for detecting a known transmission pattern, a coincident bit number detecting circuit for detecting a coincident bit number between a received symbol and the known pattern held by the receiver within each symbol; a delay circuit for delaying a detection result; and an adder. This UW pattern matching apparatus of the present invention (first embodiment mode) has such an effect that the coincident bit detection is carried out for every 1 symbol with respect to the plurality of bits represented by 1 symbol multi-value modulation system, so that the total number of adders and also the total number of D-FFs can be reduced.

Also, a pattern matching apparatus is described that in such a case that the bit number of the known pattern is "L" and a detection threshold value is $N_{th}$, when an output value of the pattern matching is larger than, or equal to "$N_{th}$", a decision is made that the normal pattern is detected, whereas when an output value of the pattern matching is smaller than, or equal to $(L-N_{th})$, a decision is made that the inverted pattern is detected. This UW pattern matching apparatus of the present invention (second embodiment mode) has an advantage that both the normal UW pattern (indicated as "normal" contrary to the inverted UW pattern) matching and the inverted UW pattern matching can be simply realized by changing both the logic of the comparator circuit and the threshold value.

Also, a pattern matching apparatus is described that in the case where a multi-value modulation system where a plurality of bits is represented by 1 symbol is employed and also all of bits contained in 1 symbol are set to be identical to each other, an arrangement of the coincident bit number detecting circuit is limited to such a case that all of the bits are set to be identical to each other, whereby the circuit scale is reduced. This UW pattern matching apparatus of the present invention (third embodiment mode) has such an effect that since the coincident bit number detecting circuit is changed with respect to such a case that all of the bits having the same bits have been allocated into 1 symbol of the UW pattern, the circuit scale can be reduced.

Also, a pattern matching apparatus is described that a D-FF is added between a carry output of a first adder and a carry input of a second adder positioned at a next stage of the first adder, and another D-FF is added in order to adjust a time instant of an input to the second adder, whereby a pipeline process operation is realized. This UW pattern matching apparatus of the present invention (fourth embodiment mode) has such an effect that the pipeline process operation by the adders can be realized by additionally employing several D-FFs, and the real time process operation can be realized even in the highspeed symbol (bit) rate even in the case where a plurality of bits is represented by 1 symbol.

BRIEF DESCRIPTION OF THE DRAWINGS

For a better understanding of the present invention, reference is made of a detailed description to be read in conjunction with the accompanying drawings, in which:

FIG. 9 is a schematic block diagram for showing the arrangement of the first conventional pattern matching apparatus;

FIG. 10 illustrates the frame format conventionally used in the field;

FIG. 11 is an explanatory diagram for explaining operations of the first conventional pattern matching apparatus;

DESCRIPTION OF THE PREFERRED EMBODIMENTS

Referring now to various embodiments of the present invention will be described.

First Embodiment

Figure 1:
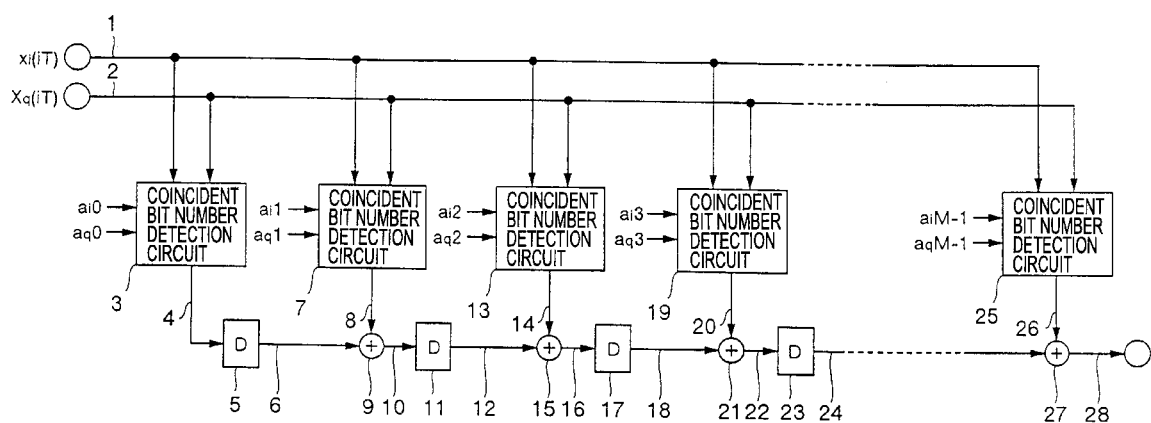
FIG. 1 is a schematic block diagram for representing an arrangement of a pattern matching apparatus according to a first embodiment of the present invention.

FIG. 1 is a schematic block diagram for indicating an arrangement of a pattern matching apparatus according to a first embodiment mode of the present invention. It is now assumed that the conventional frame format shown in FIG. 10 may be directly used. Furthermore, in this first embodiment mode, for instance, the two-value modulation system of 2bits/1 symbol is employed, and operations of this two-value modulation will be explained. It should be understood that even when an n-value modulation system is employed, the pattern matching apparatus of the present invention may be realized by merely changing such a condition that the number of input signals is equal to "n", and a coincident bit number detecting circuit detects a coincident bit number between an n-bit of the input signal and an n-bit of the known symbol.

In FIG. 1, a reception signal I and a reception signal Q are indicated by reference numeral 1 and 2, respectively. Coincident bit number detecting circuits 3, 7, 13, 19 and 25 detect the coincident bit number between the 2-bit input signal and the 2-bit known symbol. A D-FF (D type flip-flop) 5 acquires an output from the coincident bit number detecting circuit 3. D-FFs 11, 17, and 23 store addition results calculated between each of outputs derived from the respective coincident bit number detecting circuits related to the own D-FFs, and each of outputs derived from the pre-staged D-FFs. Adding circuits 9, 15, 21, and 27 add each of outputs derived from the coincident bit number detecting circuits related to the respective adding circuits to each of the outputs derived from the relevant D-FFs.

Figures 2, 3:
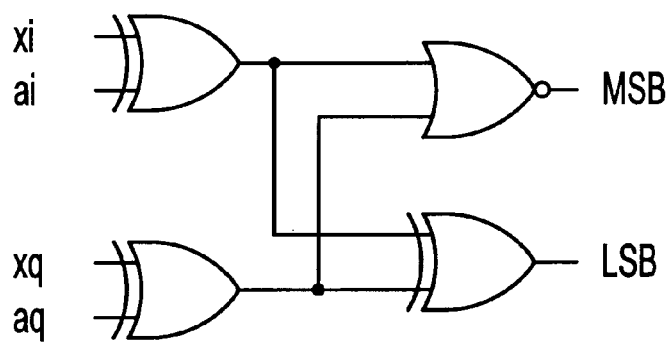
FIG. 2 shows a truth table of a coincident bit number detecting circuit according to the first embodiment of the present invention.
FIG. 3 is a schematic block diagram for indicating an arrangement of the coincident bit number detecting circuit according to the first embodiment of the present invention.

Next, a truth table for the coincident bit number detecting circuits 3, 7, 13, 19 and 25 is illustrated in FIG. 2.

In the truth table of FIG. 2, the following conditions are given:

When $x_i$ is made coincident with $a_i$ and $x_q$ is made coincident with $a_q$, then a result is 2 ("10" in table).

When $x_i$ is made coincident with $a_i$ but $x_q$ is not made coincident with $a_q$, then a result is 1 ("01" in table).

When $x_i$ is not made coincident with $a_i$ but $x_q$ is made coincident with $a_q$, then a result is 1 ("01" in table).

When $x_i$ is not made coincident with $a_i$ and $x_q$ is made coincident with $a_q$, then a result is 0 ("00" in table).

Accordingly, an example of a circuit of the coincident bit number detecting circuit is shown in FIG. 3.

A description will now be made of operations when a length of a UW pattern (unique word pattern) is selected to be 5 symbols (M=5). It should also be noted that symbol "*" represents a calculation for detecting a coincident bit number between a pattern "x(kT)" and a pattern "ak", and also symbol "x(kT)*$a_n$" denotes a calculation for calculating a summation between the coincident number of $x_i$ and $a_i$ and the coincident number of $x_q$ and $a_q$.

At a Time Instant 0T

The coincident bit number detecting circuit 3 detects the coincident bit number between the coefficients $a_i0$ and $a_q0$ with respect to an input signal x(0T). Similarly, the coincident bit number detecting circuits 7, 13, 19, and 25 detect the coincident bit numbers of the respective coefficients with respect to the input signal x(0T). Since an initial value of the D-FF23 is equal to 0, an output 28 is given as follow:

$$y(0T)=a4*x(0T).$$

At this time, since the quantity of the input data is not equal to that of the patterns, no UW pattern detection decision is carried out.

At a Time Instant 1T

Since an initial value of the D-FF arranged at one preceding stage is equal to 0, detection results of coincident bit numbers between the input signal x(0T) and the coefficients a0, a1, a3, a4 are stored into the D-FFs, respectively. A coincident bit number detection is made between each of the coefficients a0, a1, a2, a3, a4 and the input signal x(1T). Since the value of the D-FF 23 is equal to a3*x(1T), an output y(0T) is given as follows:

$$y(1T)=a3*x(0T)+a4*x(1T)$$

At this time, since the quantity of the input data is not equal to that of the patterns, no UM pattern detection decision is carried out.

At a Time Instant 2T

A detection result of coincident bit number made between an input signal x(1T) and the coefficient a0 is stored into the D-FF5. An addition result made by adding a 1T-preceding value of the D-FF5 to the coincident bit number detecting result obtained between the input signal x(1T) and the coefficient a1 is stored into the D-FF11. Another addition result made by adding a 1T-preceding value of the D-FF11 to the coincident bit number detecting result obtained between the input signal x(1T) and the coefficient a2 is stored into the D-FF17. Another addition result made by adding a 1T-preceding value of the D-FF17 to the coincident bit number detecting result obtained between the input signal x(1T) and the coefficient a3 is stored into the D-FF23. A coincident bit number detection is carried out between an input signal x(2T) and the coefficients a0, a1, a3, and a4. Since the value of the D-FF23 is equal to $$a2*x(0T)+a3*x(1T),$$

an output y(2T) is given by:

$$y(2T)=a2*x(0T)+a3*x(1T)+a4*x(2T).$$

At this time, since the quantity of the input data is not equal to that of the patterns, no UW pattern detection decision is carried out.

At a Time Instant 3T

A detection result of coincident bit number made between an input signal x(2T) and the coefficient a0 is stored into the D-FF5. An addition result made by adding a 1T-preceding value of the D-FF5 to the coincident bit number detecting result obtained between the input signal x(2T) and the coefficient a1 is stored into the D-FF11. Another addition result made by adding a 1T-preceding value of the D-FF11 to the coincident bit number detecting result obtained between the input signal x(2T) and the coefficient a2 is stored into the D-FF17. Another addition result made by adding a 1T-preceding value of the D-FF17 to the coincident bit number detecting result obtained between the input signal x(2T) and the coefficient a3 is stored into the D-FF23. A coincident bit number detection is carried out between an input signal x(3T) and the coefficients a0, a1, a3, and a4. Since the value of the D-FF23 is equal to $$a1*x(0T)+a2*x(1T)+a3*x(2T),$$

an output y(3T) is given by:

$$y(3T)=a1*x(0T)+a2*x(1T)+a3*x(2T)+a4*x(3T).$$

At this time, since the quantity of the input data is not equal to that of the patterns, no UW pattern detection decision is carried out.

At a Time Instant 4T

A detection result of coincident bit number made between an input signal x(3T) and the coefficient a0 is stored into the D-FF5. An addition result made by adding a 1T-preceding value of the D-FF5 to the coincident bit number detecting result obtained between the input signal x(3T) and the coefficient a1 is stored into the D-FF11. Another addition result made by adding a 1T-preceding value of the D-FF11 to the coincident bit number detecting result obtained between the input signal x(3T) and the coefficient a2 is stored into the D-FF17. Another addition result made by adding a 1T-preceding value of the D-FF17 to the coincident bit number detecting result obtained between the input signal x(3T) and the coefficient a3 is stored into the D-FF23. A coincident bit number detection is carried out between an input signal x(4T) and the coefficients a0, a1, a3, and a4. Since the value of the D-FF23 is equal to $$a0*x(0T)+a1*x(1T)+a2*x(2T)+a3*x(3T),$$

an output y(4T) is given by:

$$y(4T)=a0*x(0T)+a1*x(1T)+a2*x(2T)+a3*x(3T)+a4*x(4T).$$

At this time, since the quantity of the input data is made equal to that of the patterns, the UW pattern detection judgement is commenced. In this UW pattern detection judgement, when the detected coincident bit number is larger than, or equal to a threshold value, as compared with this threshold value of the coincident bit number, it is determined that the pattern can be detected.

Second Embodiment

In the above-described first embodiment mode, the UW pattern detecting apparatus capable of reducing the total numbers of address as well as D-FFs has been described.

In a communication system, there is a possibility that a time-instant notifying frame is provided in a plurality of frames at one time. Normally, such a frame structure is called as a "super frame". Then, a frame used to notify an end of a super frame is called as a "super-frame notifying frame". Also, in order to notify this super frame, there is a possibility that a pattern (UW pattern) is inverted is used to effect notification.

Figure 4:
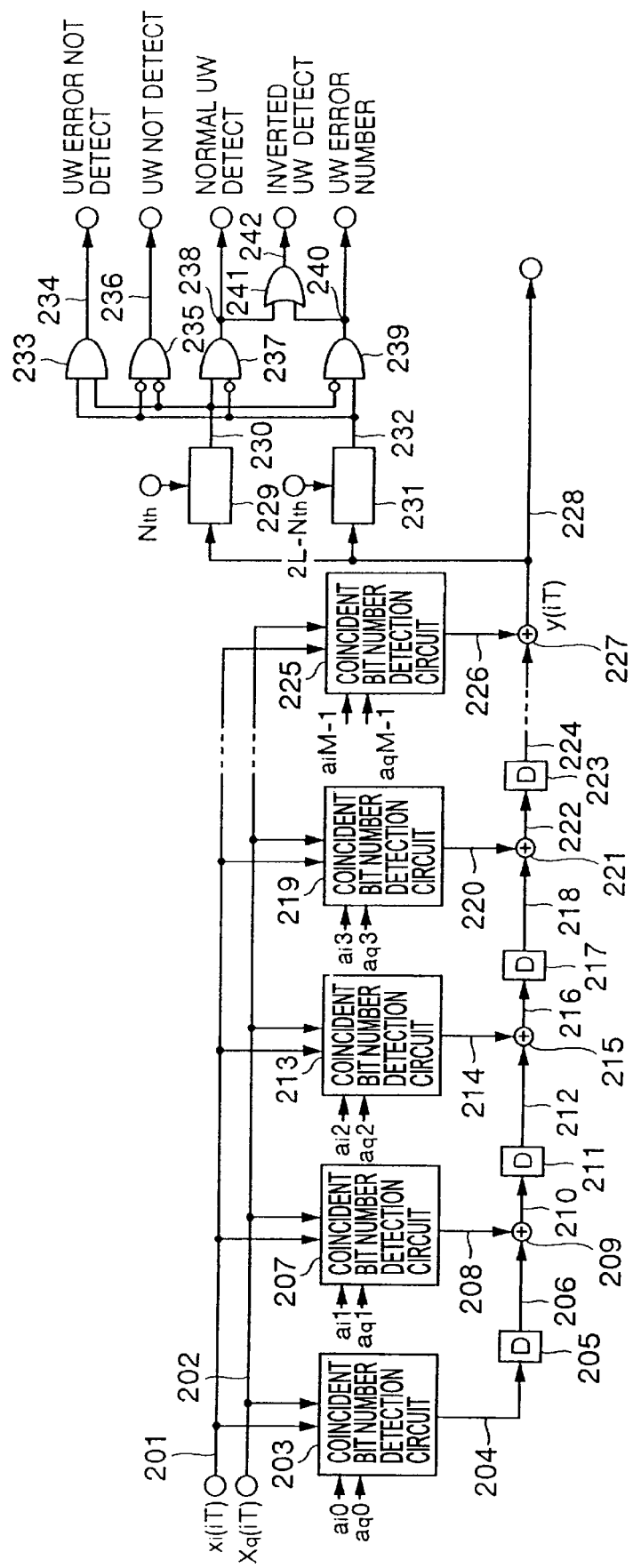
FIG. 4 is a schematic block diagram for representing an arrangement of a pattern matching apparatus according to a second embodiment of the present inventions.

Now, in accordance with a second embodiment mode, a description will be made of an arrangement capable of also detecting this inverted UW pattern used to notify the super frame. FIG. 4 is a schematic block diagram for explaining a pattern matching apparatus according to the second embodiment.

In FIG. 4, it should be noted that UW pattern coincident bit number detecting circuits 203, 207, 213, 219, and 225 are identical to those of FIG. 1. A method for matching the normal UM pattern (assuming that not inverted condition is "normal") and the inverted UW pattern will now be explained.

An output 228 of the UM pattern coincident bit detecting circuit is inputted into a comparator 229 and another comparator 231. The comparator 229 is employed so as to match the normal UW pattern, whereas the comparator 231 is employed so as to match the inverted UM pattern. In the comparator 229, a comparison is made with a threshold value "$N_{th}$".

In such a case of $k(kT) \geq N_{th}$, it is so judged that the normal UW pattern is matched. Since the coincident bit number is detected by the UW pattern coincident bit number detecting circuit, the coincident bit number of the UW patterns is subtracted from a total bit number ("2L" in this example) of the UW patterns, so that the coincident bit number of the inverted UW patterns can be calculated. In accordance with this second embodiment mode, if a subtraction circuit is employed, then the circuit scale would be increased. Therefore, a threshold value ("$2L-N_{th}$" in this example) used to match the inverted UW pattern is entered into the comparator 231 to thereby execute a threshold value judgement. That is, in such a case of $y(xT) \leq 2L-N_{th}$, it is so judged that the inverted UW pattern can be matched. It should also be noted that since such cases of "normal UW matching" and further "inverted UW matching" are handled as "error matching" in this second embodiment mode, the final judgement is carried out based on the following logic:

"$y(kT) \geq N_{th}$" as well as "$y(kT) > 2L-N_{th}$"="normal UW matching",

"$y(kT) < N_{th}$" as well as "$y(kT) \leq 2L-N_{th}$"="inverted UW matching",

"normal UW matching" or "inverted UW matching"= "UW matching",

"$y(kT) < N_{th}$ as well as "$y(kT) > 2L-N_{th}$"="UW non-matching",

"$y(kT) \geq N_{th}$" as well as "$y(kT) < 2L-N_{th}$"="UW error matching".

As previously described, both the normal UW pattern matching and the inverted UW pattern matching can be realized in the pattern matching apparatus of the second embodiment.

Third Embodiment

In the above-described first embodiment, the UW pattern matching circuit has been described in the case that a plurality of bits is represented by 1 symbol is employed in the UW pattern. However, there is such a case that all of bits within 1 symbol are set to the same values as the UW pattern in the plural bits/1 symbol modulation system. This may be achieved in, for example, the QPSK modulation system, namely, only "00" and "11" are transmitted in a 2 bits/1 symbol modulation system. The S/N capable of obtaining a desirable error rate may be made equivalent to that of the BPSK modulation system, resulting in an improvement of approximately 3 dB. As a consequence, in accordance with the third embodiment mode, the circuit scale of the UW pattern coincident bit number detecting circuit can be reduced in such a case.

Figures 5, 6:
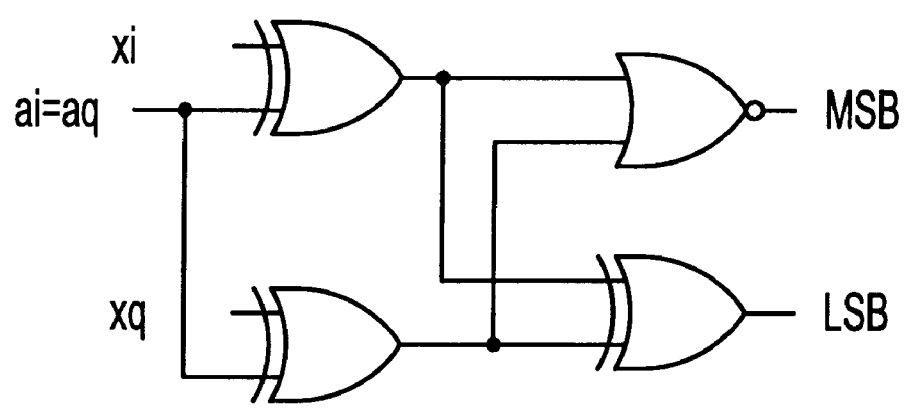
FIG. 5 shows a truth table of a coincident bit number detecting circuit according to a third embodiment of the present invention.
FIG. 6 is a schematic block diagram for indicating an arrangement of the coincident bit number detecting circuit according to the third embodiment of the present invention.

Then, there is shown a truth table when $a_i=a_q$ in FIG. 5. Furthermore, FIG. 6 represents an example of a circuit of the coincident bit number detecting circuit capable of realizing this truth table.

Fourth Embodiment

In the UW pattern matching circuit of the first embodiment, the adders are employed. However, while the transmission rate is increased, the real time process operation will become difficult due to carry delays by the adders. As a consequence, in accordance with the fourth embodiment, a UW pattern matching circuit capable of being operated in a high speed by executing a pipeline process operation will now be described.

Figure 7:
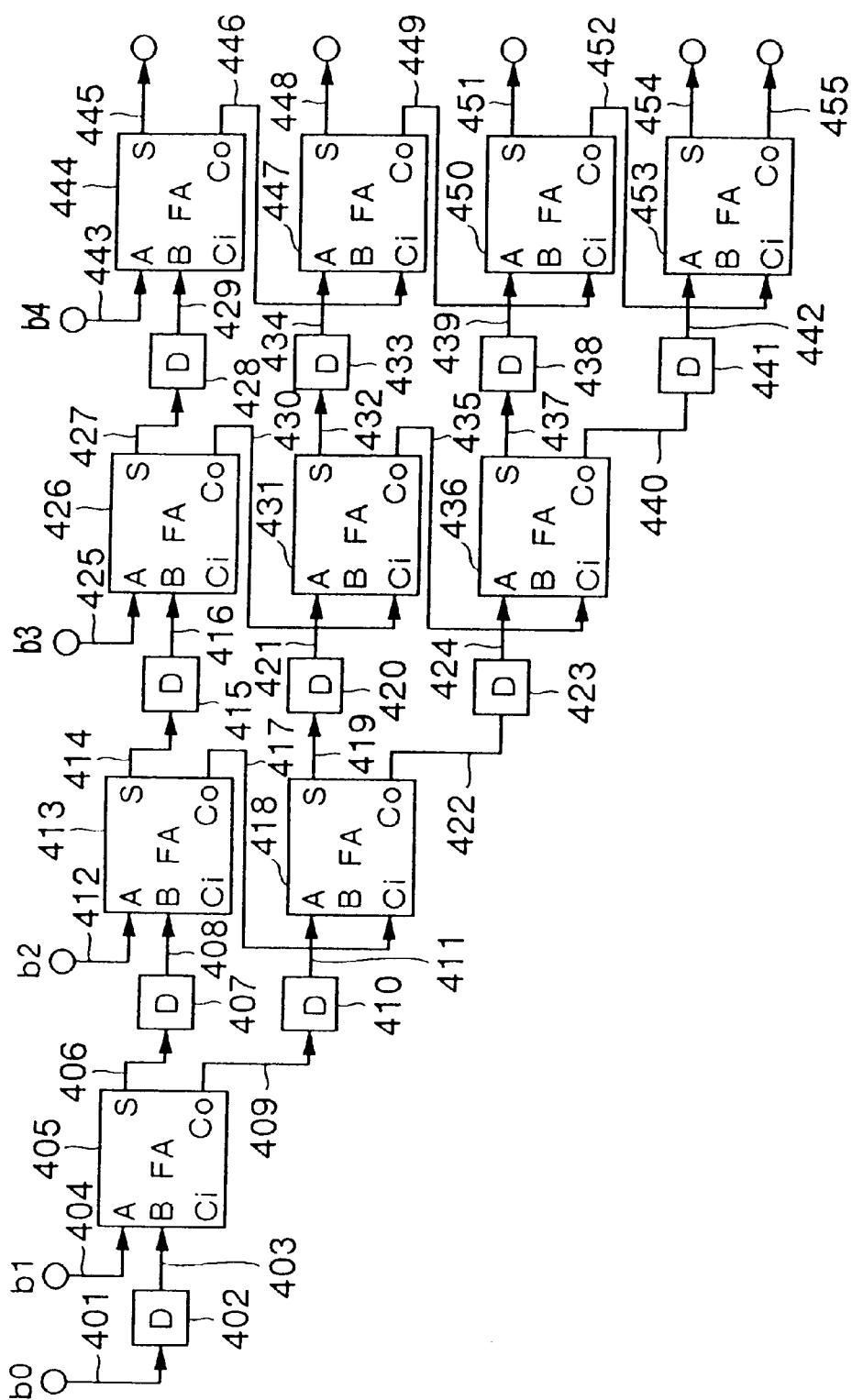
FIG. 7 is a schematic block diagram for representing a detailed structure of the adder shown in FIG. 1.

FIG. 7 represents a structure of the adders, which has not been described in detail in FIG. 1. Symbols "b0" to "b4" correspond to the outputs from the coincident bit number detecting circuit of FIG. 1. Also outputs 455, 454, 451, 448, and 445 corresponds to the output 28 of FIG. 1 indicated by the binary number. These outputs are derived from 455 (MSB) via 454, 451, and 448 to 445 (LSB) in this order. As explained above, for example, the adder 15 of FIG. 1 is realized by a full adder 413 and another full adder 418. When the bit number of this adder is increased, it is practically difficult to execute the real time process operation when the adder is operated in high speed due to the transfer delays of the carry.

To avoid this difficulty, a D-FF is inserted into the output of the full adder (abbreviated as "FA"), and also another D-FF for time adjustment purposes is inserted into the output of the D-FF 410. Under such a circumstance, the real time process operation by both the FA413 and the FA418 can be achieved if the calculation is accomplished within the clock time of the D-FF. In this manner, the pipeline process operation can be realized.

Figure 8:
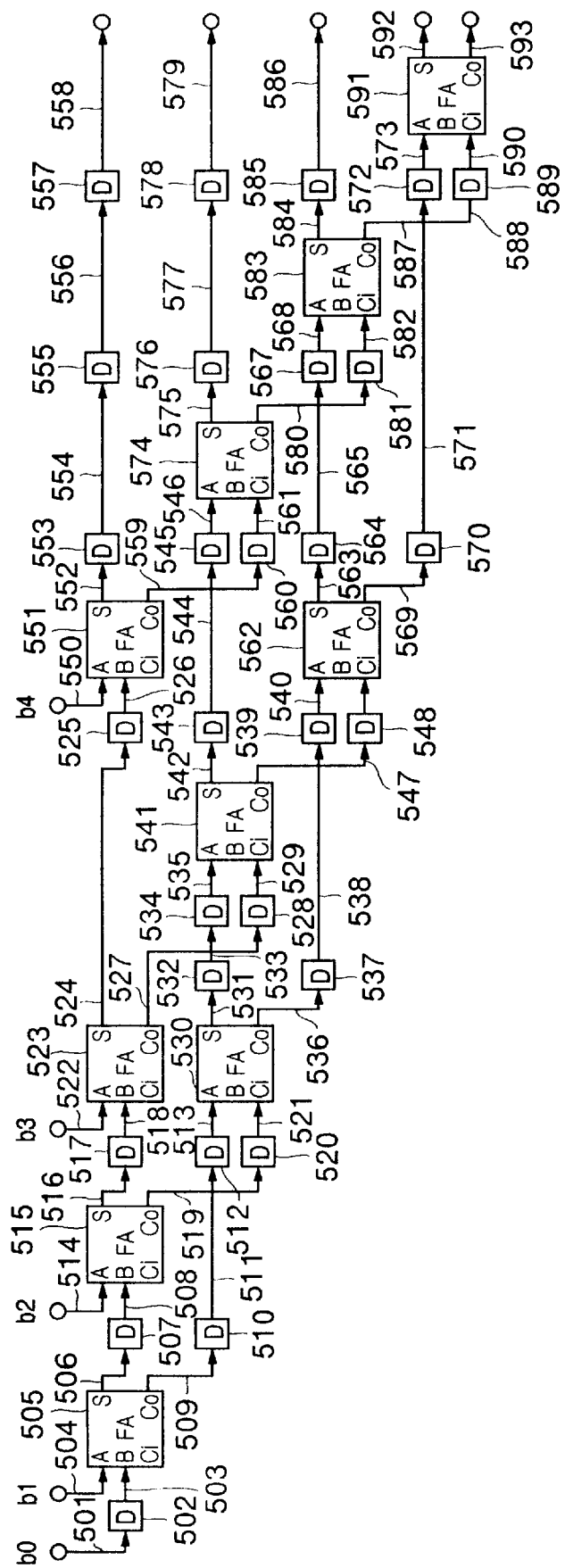
FIG. 8 is a schematic block diagram for showing an arrangement of a pattern matching apparatus according to a fourth embodiment of the present invention, namely an arrangement of adders for realizing a pipeline process.
Figure 12:
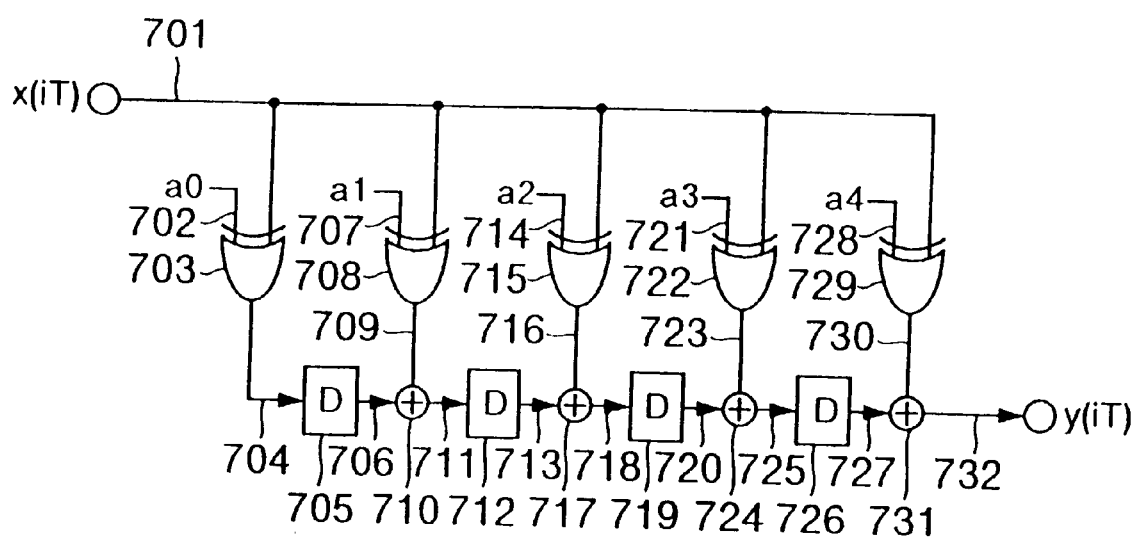
FIG. 12 is a schematic block diagram for representing the arrangement of the second conventional pattern matching apparatus.
Figure 13:
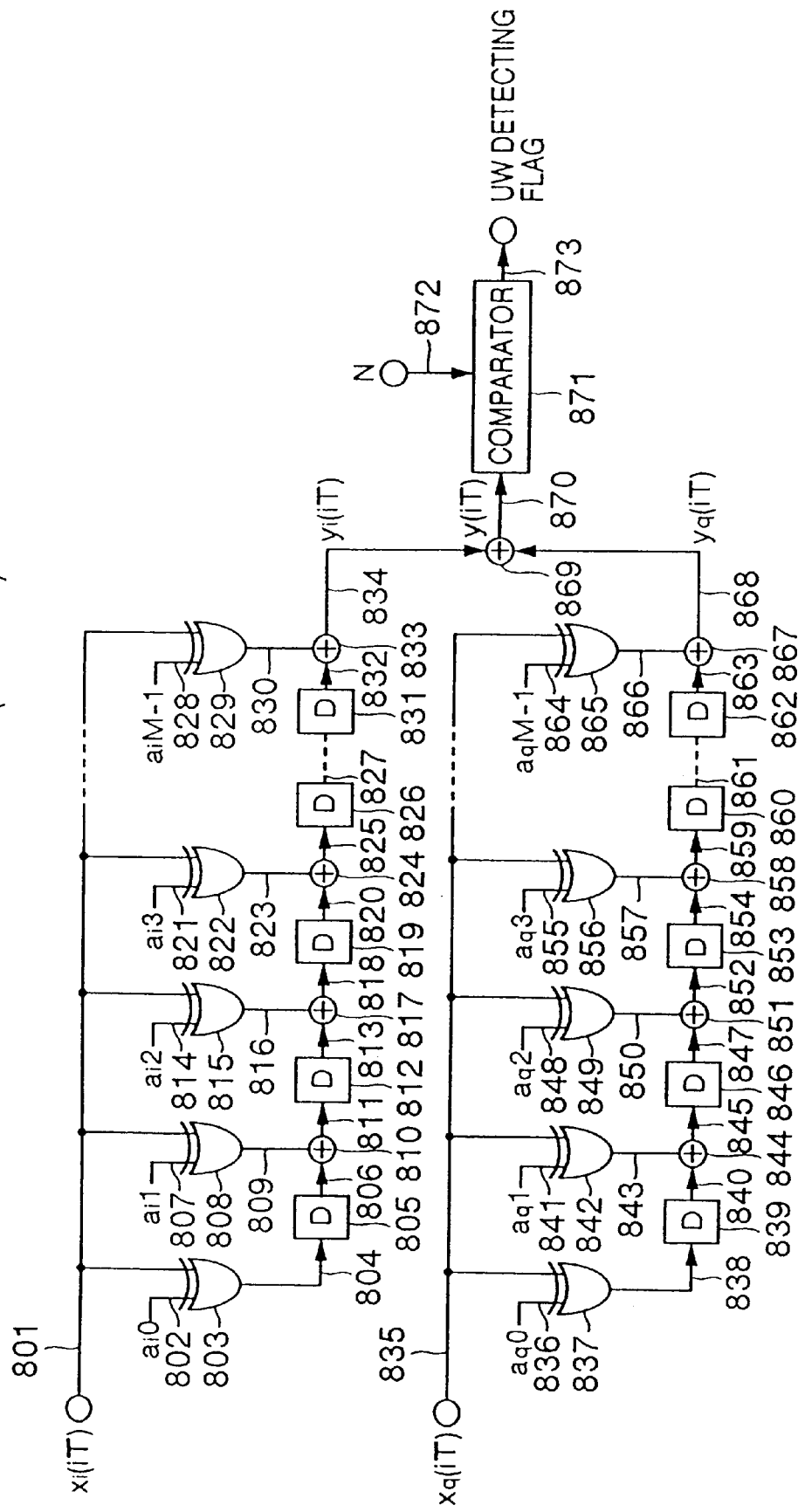
FIG. 13 is a schematic block diagram for showing the arrangement of the third conventional pattern matching apparatus.

In FIG. 8, there is shown an arrangement of adders after this arrangement has been modified to execute the pipeline process operation. All of D-FFs are provided among an S equal to the output of the full adder FA, a Co (carry out), and an input of the FA at the next stage, and the pipeline process operation can be realized. To realize this pipeline process operation, since the D-FF is added to the carry, namely the upper digit bit, there is a temporal difference between the upper digit bit and the lower digit bit. To adjust this time difference, the D-FFs 555, 557, and 578 for the time adjustment purpose are additionally provided on the side of the lower digit bit.

As previously described, since several D-FFs are added to thereby realize the pipeline process operation, the real time process operation can be performed even in the highspeed symbol (bit) rate.

Although the inputs to the full adder of FIG. 8 are A, B, Ci (carry-in), since the number of inputs is selected to be 2, the Ci (carry-in) may be omitted.

As apparent from the above-described embodiment modes, the UW pattern matching apparatus of the present invention (first embodiment mode) has such an effect that the coincident bit detection is carried out every 1 symbol with respect to the plural bits/1 symbol multi-value modulation system, so that the total number of adders and also the total number of D-FFs can be reduced.

Also, the UW pattern matching apparatus of the present invention (second embodiment mode) has an advantage that both the normal UW pattern (indicated as "normal" contrary to the inverted UW pattern) matching and the inverted UW pattern matching can be simply realized by changing both the logic of the comparator circuit and the threshold value.

Also, the UW pattern matching apparatus of the present invention (third embodiment mode) has such an effect that since the coincident bit number detecting circuit is changed with respect to such a case that all of the bits having the same bits have been allocated into 1 symbol of the UW pattern, the circuit scale can be reduced.

Further, the UW pattern matching apparatus of the present invention (fourth embodiment mode) owns such an effect that the pipeline process operation by the adders can be realized by additionally employing several D-FFs, and the real time process operation can be realized even in the highspeed symbol (bit) rate.

What is claimed is:

1. A pattern matching apparatus for use in a receiver for a multi-value modulated signal in which a symbol represents a plurality of bits, to detect a known transmission pattern, said pattern matching apparatus comprising:
   a coincident bit number detecting circuit for detecting a coincident bit number between a received symbol and a symbol of the known transmission pattern, and providing a detection result;
   a delay circuit for delaying the detection result, the delay circuit providing a delayed detection result;
   another coincident bit number detecting circuit for detecting a coincident bit number between another received symbol and another symbol of the known transmission pattern, and providing another detection result; and
   an adder which receives the delayed detection result and the another detection result.

2. A pattern matching apparatus according to claim 1 wherein, the known transmission pattern has kL bits, where k is the number of bits represented by one symbol, and wherein the pattern matching apparatus further comprises:
   means, connected to the adder, for generating an output value of the pattern matching; and
   means for comparing the output value of the pattern matching to a detection threshold $N_{th}$, for judging that the known transmission pattern has been detected if the output value of the pattern matching is greater than $(kL-N_{TH})$, and for judging that an inversion of the known transmission pattern has been detected if the output value of the pattern matching is smaller than or equal to $(kL-N_{th})$.

3. A pattern matching apparatus according to claim 1 wherein all of the bits contained in 1 symbol of the known transmission pattern are set to be identical to each other, and wherein the coincident bit number detecting circuit is responsive to the identical bits of one symbol of the known transmission pattern, whereby a circuit scale is reduced.

4. A pattern matching apparatus according to claim 1 wherein, a D-FF is added between a carry output of a first adder and a carry input of a second adder positioned at a next stage of the first adder, and another D-FF is added in order to adjust a time instant of an input to said second adder, whereby a pipeline process operation is realized.

5. A pattern matching apparatus according to claim 2 wherein all of the bits contained in 1 symbol of the known transmission pattern are set to be identical to each other, and wherein the coincident bit number detecting circuit is responsive to the identical bits of one symbol of the known transmission pattern, whereby a circuit scale is reduced.

6. A pattern matching apparatus according to claim 2 wherein, a D-FF is added between a carry output of a first adder and a carry input of a second adder positioned at a next stage of the first adder, and another D-FF is added in order to adjust a time instant of an input to said second adder, whereby a pipeline process operation is realized.

7. A pattern matching apparatus for detecting whether an input signal carried by a plurality of input conductors includes a known sequence of symbols, each symbol of the known sequence being represented by a plurality of bits, comprising:
   first coincident bit detection means, connected to the plurality of input conductors and also receiving signals for the bits of a first one of the symbols of the sequence, for detecting a first coincident bit number that identifies how many bits of the first one of the symbols are present in the input signal, the first coincident bit number being an integer equal to or greater than zero;
   first storage means for storing the first coincident bit number;
   second coincident bit detection means, connected to the plurality of input conductors conductors and also receiving signals for the bits of a second one of the symbols of the sequence, for detecting a second coincident bit number that identifies how many bits of the second one of the symbols are present in the input signal, the second coincident bit number being an integer equal to or greater than zero;

first adding means for adding the first coincident bit number stored in the first storage means to the second coincident bit number to provide a first coincident bit sum;

second storage means for storing the first coincident bit sum; and further means, connected to the plurality of input conductors and receiving the first coincident bit sum, for generating a total coincident bit sum.

8. The pattern matching apparatus according to claim 7, further comprising means for comparing the total coincident bit sum to a threshold value.

9. The pattern matching apparatus according to claim 7, wherein the known transmission pattern has kL bits, where k is the number of bits represented by one symbol, and wherein the pattern matching apparatus further comprises:

means, connected to the adder, for generating an output value of the pattern matching;

means for comparing the output value of the pattern matching to a detection threshold $N_{th}$, for determining that the known transmission pattern has been detected if the output value of the pattern matching is greater than $(kL-N_{th})$ and for determining that an inversion of the known transmission pattern has been detected if the output value of the pattern matching is less than or equal to $(kL-N_{th})$.

10. The pattern matching apparatus according to claim 7, wherein all of the bits contained in 1 symbol are set to be identical to each other further comprising an arrangement of the coincident bit detection means is limited to such a case that all of the bits are set to be identical to each other, whereby a circuit scale is reduced.

11. The pattern matching apparatus according to claim 7, wherein a D-FF is added between a carry output of a first adder and a carry input of a second adder positioned at a next stage of the first adder, and another D-FF is added in order to adjust a time instant of an input to said second adder, whereby a pipeline process operation is realized.

12. The pattern matching apparatus according to claim 8, wherein all of the bits contained in 1 symbol are set to be identical to each other further comprising an arrangement of the coincident bit detection means is limited to such a case that all of the bits are set to be identical to each other, whereby a circuit scale is reduced.

13. The pattern matching apparatus according to claim 8, wherein a D-FF is added between a carry output of a first adder and a carry input of a second adder positioned at a next stage of the first adder, and another D-FF is added in order to adjust a time instant of an input to said second adder, whereby a pipeline process operation is realized.

14. The pattern matching apparatus according to claim 7, wherein the first storage means delays the availability of the first coincident bit number by (n−1) time instants, where n is the number of symbols in the known transmission pattern.

15. The pattern matching apparatus according to claim 7, wherein the second storage means delays the availability of the sum of the first coincident bit number and the second coincident bit number by (n−2) time instants, where n is the number of symbols in the known transmission pattern.

* * * * *